United States Patent
Riddiford et al.

(10) Patent No.: US 9,372,513 B1
(45) Date of Patent: Jun. 21, 2016

(54) COUPLING ELEMENT FOR HINGED ELECTRONIC DEVICE

(71) Applicant: Google Inc., Mountain View, CA (US)

(72) Inventors: Martin Philip Riddiford, London (GB); Kenneth Ryan Loo, San Jose, CA (US); Rachael Elizabeth Roberts, San Francisco, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 14/039,358

(22) Filed: Sep. 27, 2013

(51) Int. Cl.
 *G06F 1/16* (2006.01)
(52) U.S. Cl.
 CPC .................................. *G06F 1/1681* (2013.01)
(58) Field of Classification Search
 CPC ... G06F 1/1601; G06F 1/1616; G06F 1/1624; G06F 1/1633
 USPC ..................................................... 361/679.28
 See application file for complete search history.

(56) References Cited

U.S. PATENT DOCUMENTS

| | | | | |
|---|---|---|---|---|
| 5,043,846 | A | * | 8/1991 | Kinoshita .............. F16M 11/10 16/308 |
| 5,085,394 | A | | 2/1992 | Torii |
| 5,168,426 | A | * | 12/1992 | Hoving ................. G06F 1/1681 16/361 |
| 5,200,913 | A | | 4/1993 | Hawkins et al. |
| 5,267,123 | A | | 11/1993 | Boothroyd et al. |
| 5,278,725 | A | | 1/1994 | Konno et al. |
| 5,566,048 | A | * | 10/1996 | Esterberg ............. G06F 1/1616 16/307 |
| 5,754,395 | A | | 5/1998 | Hsu et al. |
| 5,844,543 | A | | 12/1998 | Tamura et al. |
| 6,125,029 | A | * | 9/2000 | Sasaki ..................... G06F 1/165 345/905 |
| 6,487,068 | B1 | | 11/2002 | Rahemtulla |
| 6,867,961 | B2 | * | 3/2005 | Choi ..................... G06F 1/1681 248/176.3 |
| 6,870,730 | B2 | | 3/2005 | Riddiford |
| 6,925,684 | B2 | | 8/2005 | Kang et al. |
| 7,024,727 | B1 | * | 4/2006 | Huang ................... G06F 1/162 16/354 |

(Continued)

FOREIGN PATENT DOCUMENTS

EP         1187261 A2     3/2002

OTHER PUBLICATIONS

"iTouchless 8-Gallon Trash Can with Infrared-Sensor Lid Opener, Stainless Steel" Walmart.com [online]. [Retrieved Jul. 30, 2013]. <http://www.walmart.com/ip/iTouchless-Stainless-Steel-Trash-Can-With-Infrared-Sensor-Lid-Opener-IT08RCB/10247557>, 2 pages.

(Continued)

*Primary Examiner* — Anthony Q Edwards
(74) *Attorney, Agent, or Firm* — Lerner, David, Littenberg, Krumholz & Mentlik, LLP (57) ABSTRACT

A computer includes a lid defining a lower edge. A hinge is connected to the lid along the lower edge. The computer further includes a base having an upper surface and a keyboard disposed on the upper surface and defining a back edge. A mounting assembly is connected with the base between the back edge and the keyboard. The mounting assembly has an attachment feature that moves along a translational path in a direction between the back edge and the keyboard in a manner that is constrained to rotation thereof. The hinge is rotatably connected to the lid to be rotatable with respect to the base. The hinge is rotatably affixed with the attachment feature such that rotation of the lid drives rotation of the attachment feature, which drives the movement of the attachment feature along the translational path, moving the lower edge of the therewith.

17 Claims, 8 Drawing Sheets

(56) References Cited

U.S. PATENT DOCUMENTS

| | | | | |
|---|---|---|---|---|
| 7,027,297 | B1* | 4/2006 | Mizuno | G06F 1/162 16/337 |
| 7,355,843 | B2 | 4/2008 | Riddiford | |
| 7,583,496 | B2 | 9/2009 | Lai | |
| 7,586,743 | B2 | 9/2009 | Lin | |
| 7,602,606 | B2* | 10/2009 | Schlesener | G06F 1/1616 16/254 |
| 7,616,435 | B2 | 11/2009 | Wang | |
| 7,787,242 | B2 | 8/2010 | Schwager et al. | |
| 7,848,094 | B2* | 12/2010 | Wang | G06F 1/1616 16/223 |
| 7,898,815 | B2* | 3/2011 | Tanaka | G06F 1/1616 174/254 |
| 7,916,473 | B2 | 3/2011 | Jang | |
| 8,032,987 | B2* | 10/2011 | Oshima | A63F 13/08 16/354 |
| 8,050,017 | B2 | 11/2011 | Riddiford | |
| 8,200,300 | B2* | 6/2012 | Wang | G06F 1/1616 312/223.1 |
| 8,248,772 | B2 | 8/2012 | Dai et al. | |
| 8,248,788 | B2 | 8/2012 | Wu et al. | |
| 8,248,789 | B2 | 8/2012 | Wu et al. | |
| 8,250,711 | B1* | 8/2012 | Chen | E05D 7/081 16/239 |
| 8,254,116 | B2 | 8/2012 | Wu et al. | |
| 8,369,076 | B2 | 2/2013 | Chuang et al. | |
| 8,385,063 | B2 | 2/2013 | Zhu et al. | |
| 8,390,997 | B1 | 3/2013 | Dominy et al. | |
| 8,514,558 | B2 | 8/2013 | Song | |
| 8,559,623 | B2* | 10/2013 | Chen | H04M 1/0237 16/327 |
| 8,654,520 | B2 | 2/2014 | Lin et al. | |
| 8,713,757 | B2 | 5/2014 | Chen et al. | |
| 8,713,758 | B2 | 5/2014 | Mitsui et al. | |
| 8,780,544 | B2 | 7/2014 | Liang et al. | |
| 8,792,231 | B2 | 7/2014 | Derryberry | |
| 8,934,231 | B2* | 1/2015 | Liu | G06F 1/1601 248/229.22 |
| 2004/0216273 | A1 | 11/2004 | Kang et al. | |
| 2005/0139740 | A1 | 6/2005 | Chen et al. | |
| 2006/0077622 | A1 | 4/2006 | Keely et al. | |
| 2006/0152893 | A1* | 7/2006 | Chen | G06F 1/1616 361/679.06 |
| 2006/0267947 | A1* | 11/2006 | Nishiyama | G06F 1/162 345/168 |
| 2007/0030634 | A1 | 2/2007 | Maskatia | |
| 2007/0104467 | A1* | 5/2007 | Wang | G06F 1/162 386/362 |
| 2008/0101003 | A1 | 5/2008 | Lin | |
| 2008/0174942 | A1* | 7/2008 | Yang | G06F 1/1616 361/679.27 |
| 2008/0304217 | A1* | 12/2008 | Lai | G06F 1/1616 361/679.26 |
| 2009/0016002 | A1* | 1/2009 | Lai | G06F 1/1616 361/679.27 |
| 2009/0131127 | A1 | 5/2009 | Hung | |
| 2011/0023272 | A1 | 2/2011 | Huang | |
| 2011/0170812 | A1 | 7/2011 | Lee | |
| 2011/0177850 | A1* | 7/2011 | Griffin | G06F 1/1616 455/575.3 |
| 2011/0194233 | A1 | 8/2011 | Ahn et al. | |
| 2012/0092820 | A1* | 4/2012 | Hautamaki | H04M 1/0241 361/679.02 |
| 2012/0217855 | A1* | 8/2012 | Chen | G06F 1/1616 312/323 |
| 2012/0328222 | A1 | 12/2012 | Chen et al. | |
| 2013/0308268 | A1* | 11/2013 | Tani | G06F 1/1679 361/679.57 |
| 2014/0001941 | A1 | 1/2014 | Liang et al. | |
| 2014/0029175 | A1 | 1/2014 | Li | |
| 2014/0125553 | A1* | 5/2014 | Kim | G06F 1/1616 345/1.3 |
| 2014/0168878 | A1 | 6/2014 | Jheng | |
| 2015/0009611 | A1* | 1/2015 | Constin | G06F 1/1624 361/679.11 |

OTHER PUBLICATIONS

Tobias loft, "The motorised laptop" [online]. Jul. 2009. [Retrieved Jun. 24, 2013]. <http://portfolio.tobiastoft.dk/The-motorised-laptop>, 3 pages.

* cited by examiner

COUPLING ELEMENT FOR HINGED ELECTRONIC DEVICE

BACKGROUND

Portable computers are often configured in a "notebook" or "clamshell" arrangement. These types of computers most often package a majority of the internal components associated with a computer into a base assembly. Such components include a printed circuit board that carries a computer's central processor, any additional peripheral processors, and at least some of the computer's memory. Additionally, the base can house one or more batteries to provide portable power for the computer, internal storage such as a hard drive or a solid state drive, mechanical connections for peripheral devices and related circuitry, the computer's input devices, and circuitry for a wired or wireless internet connection (such as via WiFi or a cellular data network). A lid assembly is typically attached to the base and includes a video display that can, for example, be in the form of LCD screen. The lid can also include circuitry related to the display and some additional components, such as various types of antennae, video cameras, or the like.

In such an arrangement, the input devices typically included in the base include a keyboard for alphanumeric input and various additional controls and a device configured to allow the user to control the position of a cursor displayed on the computer's display. This type of device can be in the form of a trackpad that includes a generally flat touch-sensitive surface that can detect the position and movement of a user's finger thereon. The trackpad structure can include one or more input buttons associated therewith or can be itself configured with button functionality. Other cursor-control devices can include trackballs and small buttons integrated with the keyboard that are sensitive to pressure in lateral directions.

In a notebook or clamshell arrangement, the lid is most often attached to the base by a hinge positioned at a back edge of the base (the edge that is positioned farthest from the user during use of the computer). Such a hinge can include elements to provide internal friction to maintain a position of the lid selected by the user to comfortably view the display, for example. The lid and the base can have the same or similar width and depth dimensions so that the lid can close against the base to protect both the screen and the input devices that are positioned on the top surface of the base. In such an arrangement, the computer can rest stably on a surface, even when the lid is positioned at an angle such that it extends reward of the base because of the greater comparative weight of the base.

Recently, touchscreens have grown in popularity as a means for providing both a display and an input for a computer. Touchscreens allow for users to interact directly with the images presented on the computer's display. Tablet computers are one of the primary devices that utilize a touchscreen and often lack other inputs such as trackpads and keyboards and are generally intended to be handheld or used while resting on a surface or in a stand to position them for easy interaction. Some desktop computers have also introduced form-factors that facilitate touchscreen interaction.

Various computer operating systems have begun to integrate touchscreen support either along with or in replacement of a typical cursor, which can in some cases remove the need for a cursor and associated cursor control input devices. In many applications, however, the use of a physical keyboard can prove useful or advantageous over representations thereof on a touchscreen. Traditional clamshell or notebook computer configurations, while providing a keyboard, may have disadvantages when combined with a touchscreen.

BRIEF SUMMARY

The present disclosure includes a computer that is configured to provide positioning for the screen thereof relative to the keyboard that can be more comfortable to the user when the screen is configured to receive touch inputs. The mechanism included in the computer to facilitate such positioning can beat least partially enclosed within the base thereof and can be implemented such that portions of the mechanism are concealed from view during use of the computer. Further, the mechanism can be implemented without the use of slots or other uncovered openings to the base of the computer.

An aspect of the present disclosure relates to a portable computer including a lid assembly having an outer surface, an inner surface, and a display viewable on the inner surface, the lid assembly defining a lower edge. A first hinge is connected to the lid assembly at a location intersecting the lower edge thereof. The portable computer further includes a base assembly having an upper surface, a lower surface, and a keyboard disposed on the upper surface. The base assembly further defines a front edge and a back edge spaced apart at a depth of the base assembly. A first mounting assembly is connected with the base assembly at a position between the back edge and the keyboard thereof. The mounting assembly has a first attachment feature that is configured to move along a translational path in a direction between the back edge and the keyboard in a manner that is constrained relative to rotation thereof with respect to the base assembly in a plane parallel to the upper surface thereof. The first hinge is connected to the lid such that the lid is rotatable with respect to the base assembly in a plane perpendicular to the upper surface of the base assembly and such that the display is moveable toward and away from the keyboard. The first hinge is further rotatably affixed with the attachment feature of the mounting assembly such that rotation of the lid drives rotation of the attachment feature, which further drives the movement of the attachment feature along the translational path such that lower edge of the lid assembly moves away from the back edge of the base assembly and toward the keyboard upon rotation of the lid relative to the base assembly.

In an example, the first mounting assembly can include a ring gear in a fixed position relative to the base, a planetary gear in a mesh arrangement with the ring gear, and a connector rotatably attached to the mounting assembly at a location within the ring gear. The planetary gear can be attached to the connector such that the connector maintains the planetary gear in the mesh arrangement with the ring gear. In such an example, the attachment feature can be affixed with the planetary gear. Further, the mounting assembly can be disposed within a recess in the base assembly, and the connector and the planetary gear can be configured to substantially enclose the recess.

DETAILED DESCRIPTION

Figure 1:
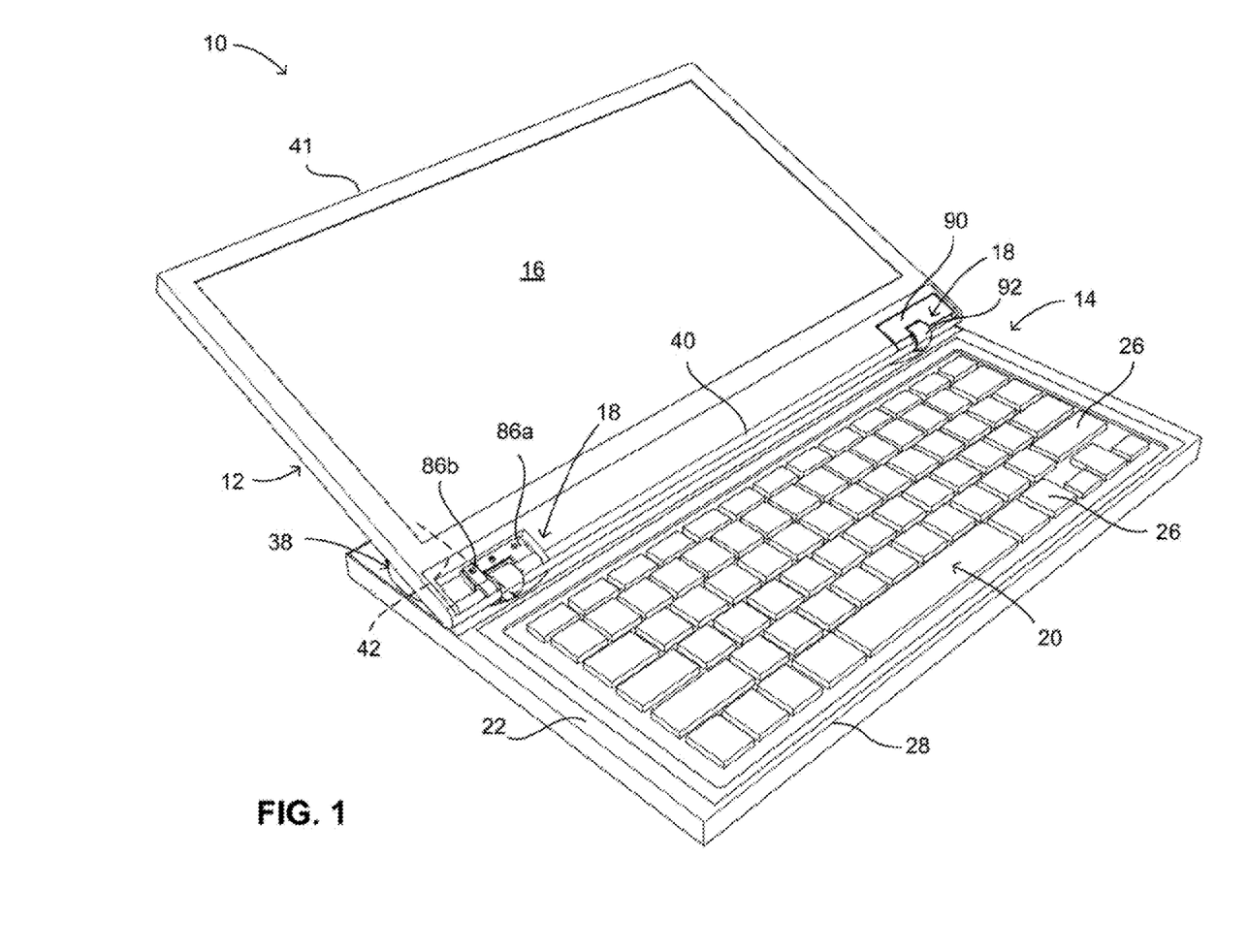
FIG. 1 is a perspective view of a portable computer according to an aspect of the present disclosure in a fully opened arrangement.
Figure 2:
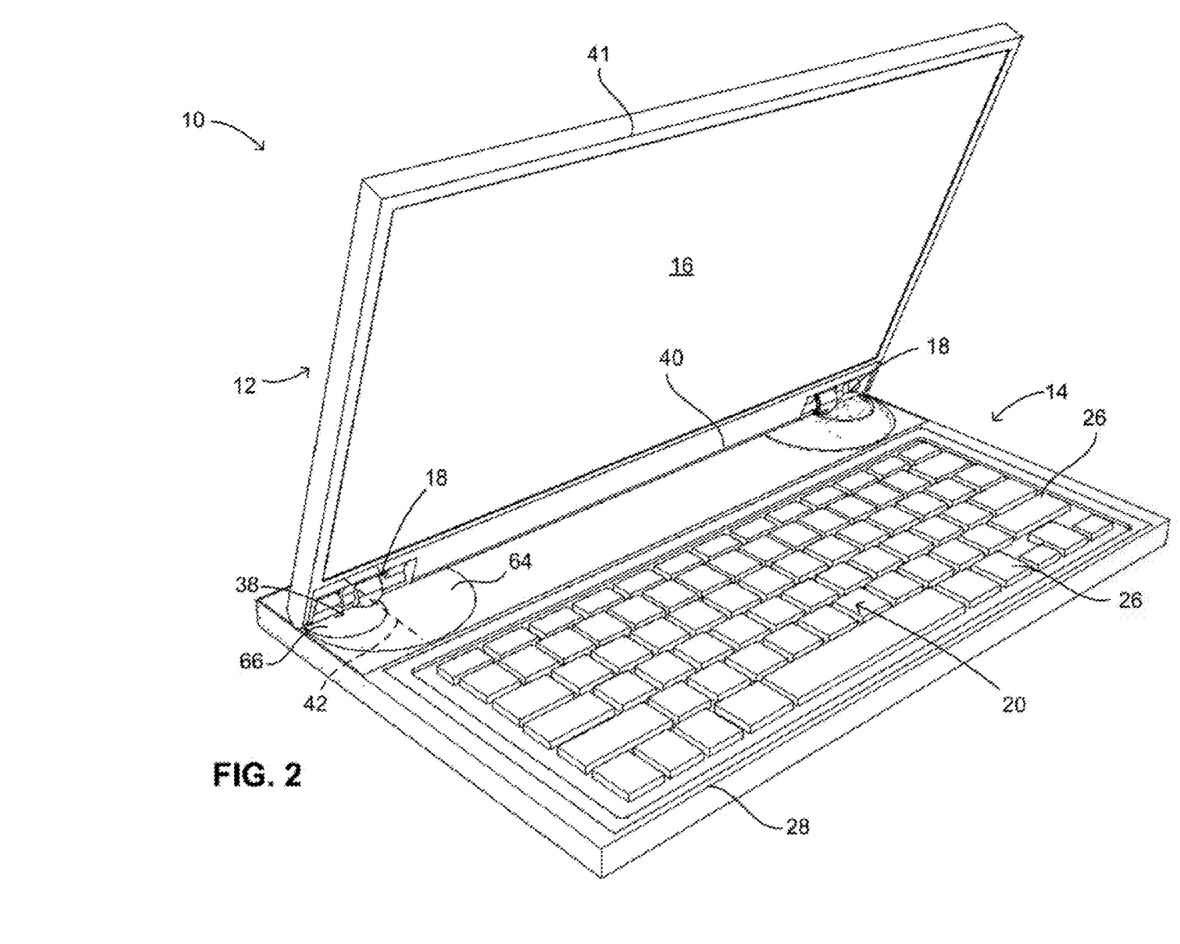
FIG. 2 is a perspective view of the computer of FIG. 1, shown in a partially opened arrangement.

Turning to the drawing figures, FIG. 1 shows a portable computer 10 in a form that is similar in some respects to a notebook or clamshell type computer with a base 14 configured to rest on a surface and to support a lid 12 including a screen 16. Lid 12 is connected to a hinge 18 that is itself attached to a mounting assembly 38 within base 14, as will be described in greater detail below. Such connections allow the lid 12 to close against the base 14, as shown in FIG. 2, and to be opened by rotation away therefrom into a user-selectable viewing position during use of computer 10, an example of which is shown in FIG. 1.

Base 14 includes a keyboard 20 positioned on an upper face 22 of base 14 such that it is accessible for use as an input device by a user when computer 10 is in an open position, as shown in FIG. 1. In an embodiment, keyboard 20 can be positioned in a recess 24 within upper face 22 so that the individual keys 26 of the keyboard 20 are positioned flush with or below upper face 22 so that lid 12 can close against face 22 without interfering with keys 26. Further, keyboard 20 can be positioned toward a front edge 28 of base 14. In an example, keyboard 20 can be positioned closer to front edge 28 than an opposing back edge 30 (FIG. 4) of base 14. This relative position can be measured from either the portion of keyboard 20 nearest front edge 28 compared to that of back edge 30 or at a center of the keyboard 20. In an example, keyboard 20 can be positioned such that the portion thereof closest to front edge 28 is within about 2 inches of front edge (e.g., +/−5%). In another example, keyboard 20 can be positioned such that the portion thereof closest to front edge 28 is within ¾ inches of front edge 28. Further, keyboard 20 can be in a position that that is, in other clamshell notebook configurations, at least partially occupied by another input device, such as a trackpad, trackball or the like.

As stated above, lid 12 includes a screen 16 disposed at an inside face 32 of lid 12 that can include a bezel area 34 that surrounds and frames screen 16. Bezel area 34 can be of a thickness necessary to retain the internal components associated with screen 16 or to give a desired strength to lid 12 overall. Face 32 can be defined on a clear substrate of a material, such as glass or the like, and screen 16 can be an area of such a substrate that overlies a display such as an LCD panel or the like. In such an example, the substrate, and accordingly the face 32 can extend outwardly over at least a portion of bezel 34. In other examples, face 32 can be partially defined on a substrate that overlies a display, the remaining portion of face 32 that is defined by another piece of material that surrounds the display. The overall size of lid 12 can be dictated at least in part by the size of the screen 16. The screen dimension can be measured by a combination of the ratio of screen width to height and a diagonal dimension of the screen 16. In an example, screen 16 can be in a widescreen format with a 16:9 width-to-height ratio. Further, screen can have a diagonal dimension of, for example, about 11 inches, about 13", about 15", or other intermediate, greater, or lesser dimensions. The overall dimensions of lid 12 can reflect the overall ratio and diagonal size of screen 16, with an allowance for the desired bezel size and additional room for other features such as the attachment to base 14 or other design features.

The dimensions of upper face 22 of base can be configured to generally match that of inside face 32 of lid 12. Thus, the width and depth of base 14 overall can be dictated in part by the dimensions of screen 16. Such a configuration can allow for screen 16 to be protected by base 14 when the computer 10 is in the closed configuration shown in FIG. 2. This configuration can also be such that a majority of the internal components of the computer 10 can be positioned within base 14. This, combined with the overall dimensions of base 14 can provide an arrangement that can stably support lid 12 through a range of viewable positions.

In an example, computer 10 can be configured with transparent touch-sensitive circuitry positioned between the display and the outer substrate or cover glass associated with screen 16. Such circuitry can be of any type that is capable of receiving touch input from a user such as by a capacitive structure, surface acoustic wave, or a resistive structure. By including such circuitry, screen 16 can be configured as a touchscreen that detects the location of a touch, or multiple touches by a user. The computer 10 can be configured to read the touch information collected by the screen 16 to detect taps, touches, or gestures of the user using, for example a finger or multiple fingers. The computer 10 can be further configured to interpret these interactions with the screen 16, allowing the user to control various functions of the computer 10 using screen 16. In a further example, computer 10 can be configured without a trackpad or other secondary input, allowing the user to interact with screen 16 and keyboard 22 alone during use of computer 10 (or additionally with a peripheral input device, such as a mouse or the like that is externally connected with computer 10).

In an example of computer 10 that includes both touchscreen 16 and keyboard 22 input, a screen 16 position that is at an angle between about 120 degrees and 160 degrees with respect to face 22 can facilitate use of computer 10, particularly during use in which a user actively or frequently switches from keyboard input to screen input. In one example a screen position of about 155 degrees (+/−5%) from upper face 22 of base 14 can facilitate such use.

The above-described positioning of screen 16 can be compared to other clamshell notebook computer configurations, which include a trackpad or other input device, a keyboard and a screen that is not configured as a touch input) or may accept touch input but is not intended as a primary input). In such configurations, the screen can be comfortably used in a range of between about 90 degrees and 110 degrees from the top surface of the corresponding base. For such notebook computers, the overall footprint, namely, the width and depth occupied by the overall notebook, including the area occupied by the base 14 along a surface, plus the distance past the base that the lid extends over such a surface, may not be substantially greater than the base itself. However, if such a notebook were opened to an angle of between 125 degrees and 150 degrees, for example, such a footprint would be nearly twice the depth of the notebook in the closed configuration.

Examples of the present hinge 18 and mounting assembly 38 can provide a computer 10 in which the lid 12 can be positioned at an angle of between, for example, 130° and 160° relative to face 22, while the footprint of the computer is 160% or less of the computer 10 in the closed configuration. In some examples, the footprint of the computer with lid 12 in the fully opened position (shown for example in FIG. 3) can be 140% of the depth of the footprint of the computer in the closed configuration. In other words, edge 44 of lid 12 can be positioned behind the back edge 30 of base 14 when lid 12 is angled at between 130° and 160° with respect to face 22 at a distance that is less than 60%, and in some examples less than 40%, of the depth of base 14.

To achieve such a dimensional configuration, computer 10 is configured such that bottom edge 40 of face 32 is translated away from back edge 30 of base 14 and toward keyboard 20 when lid 12 is moved from the closed position to an open position by translational motion that is constrained to the rotational motion of lid 12. It is noted that the open position of such a computer 10 can include any range in which screen 16 is comfortably viewable by a user. Additionally, computer 10 can be opened to an angle that is more appropriately suited for touch interaction with screen 16, such as between 125 and 150 degrees, while occupying a footprint that is smaller than that of a back-hinged configuration that provides only rotation of a lid. Such a footprint can be more convenient when using computer 10 on a crowded or small work surface, or one that is shared with other users. Further, the constrained translational movement of screen 16 that is associated with the rotation of lid 12 between various positions allows screen 16 to be positioned at distance that is farther away from the user when the screen 16 is more upright and closer to a user when it is angled backward. This can allow for comfortable use during periods of heavy keyboard interaction, such as during typing (when the screen may be comfortably positioned more upright), or during periods of heavy touchscreen interaction or combined keyboard and touchscreen interaction. During such usage, the screen can be angled to more closely match the angle of the upper face 22 of the base 14, which brings screen 16 closer to the user without the user having to reposition the computer 10 and without interference from base 14.

Figure 4:
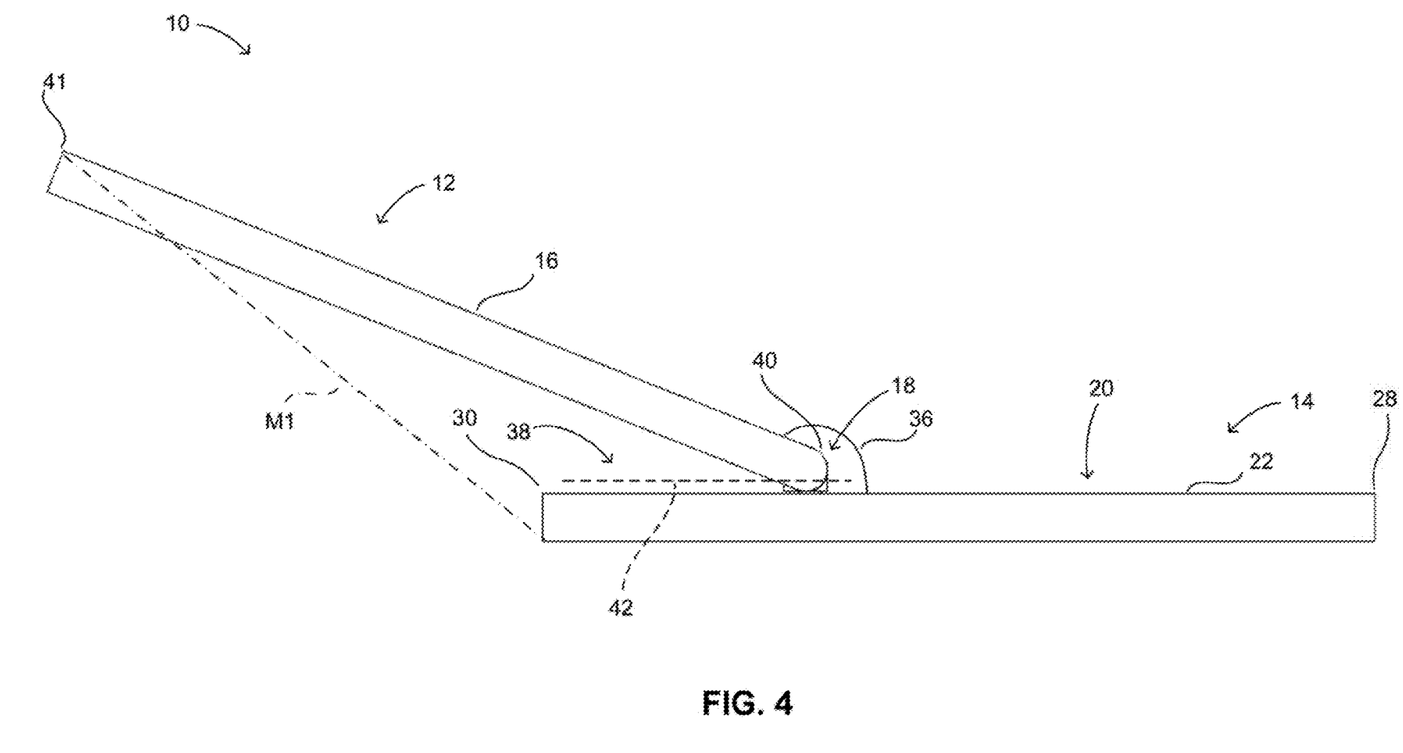
FIG. 4 is a side elevation view of the computer of FIG. 1.

By enabling translation of lower edge 40 toward keyboard 20 in connection with moving lid 12 to the open configuration, computer 10 can achieve improved stability during use. In particular, when in the open configuration, the position of the top edge 41 of screen 16 is closer to the rearward point of contact of computer 10 than it would be if lid 12 were hinged at a single point of rotation along back edge 30 of base 14. As illustrated in FIG. 4, the moment arm M1 is illustrated as a line between the uppermost edge 41 of lid 12 and the rearmost portion of base 14. In a conventional hinge arrangement, the moment arm would be approximately the entire length of the lid 12 plus the thickness of the base 14 at the point of attachment. As can be seen in FIG. 4, the length of moment arm M1 is reduced compared to such a conventional arrangement. The precise reduction in moment arm length is dependent upon the overall shape of computer 10 and the particular configuration of hinge structure 18. In one example, the moment arm M1 can be reduced compared to a conventional notebook computer arrangement of a notebook with a similarly sized lid and base at least about 20% and in some examples up to about 35% or more.

The reduction in the length of moment arm M1 can provide a stable arrangement when computer 10 is in an open configuration. This can include during adjustment of the specific position of screen 16 relative to face 22. In an example, hinge structure 18 can be configured to require a force of at least 110 grams, applied at the uppermost portion 41 of lid 12, to cause lid 12 to move against the frictional aspects of hinge structure 18. In such an example, the stability of computer 10 can be such that the base 14 of computer 10 remains in full contact with the surface on which computer 10 is resting. In a further example, hinge structure 18 can provide stability to resist tipping during interaction with screen 16 such as by touching, tapping, swiping or the like with up to a force of at least 300 grams, and in some examples up to 500 grams, at a location at the uppermost area of touch-sensitivity of screen 16.

Figure 3:
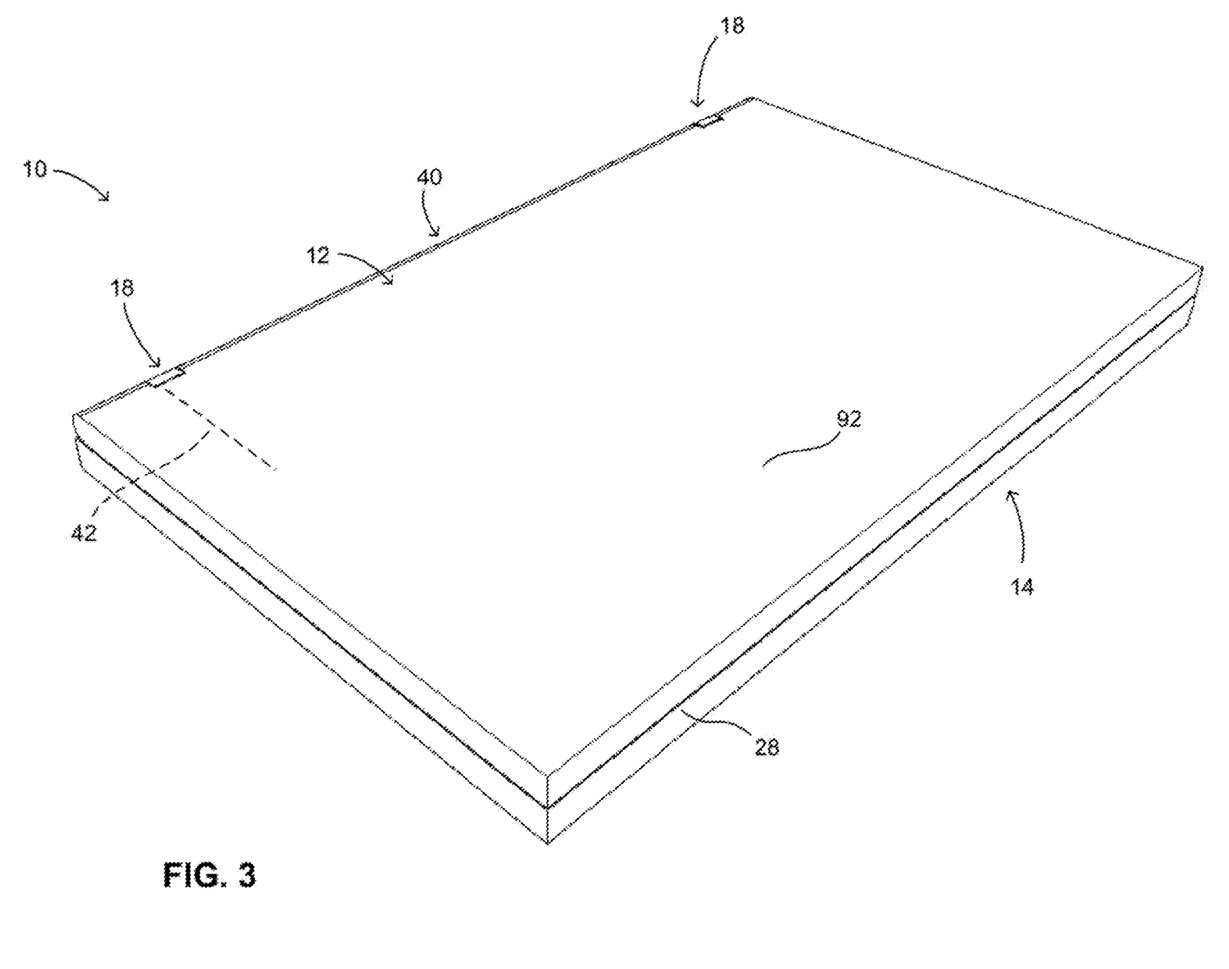
FIG. 3 is a perspective view of the computer of FIG. 1, shown in a closed arrangement.

As shown in FIGS. 1-3, lid 12 is attached to a pair of spaced-apart hinges 18 that lie along lower edge 40 of lid 12 to provide for rotation of lid 12 with respect to base 14. Hinges 18 are attached to base within respective mounting assemblies 38 included therein. As described further below, mounting assemblies 38 are configured to move hinges 18 along a substantially linear path 42 through movement thereof that is constrained relative to the rotation of lid 12. Such a connection allows bottom edge 40 to translate away from back edge 30 of base 14 as lid 12 is rotated to an open position. Similarly, as lid 12 is rotated toward the closed position, bottom edge 40 can slide toward back edge 30 of base 14. Such a configuration allows for computer 10 to implement aspects of a typical clamshell form-factor, particularly with respect to the relative sizes of base 14 and lid 12, which allows for protection of screen 16 by base 14 when in the closed position. Further, this arrangement allows for the base 14 to house the majority of the computer's internal components to provide desired weight distribution for computer 10. The hinge system 18 also allows for computer 10 to deviate from a typical clamshell form-factor in various open positions thereof. As described above, this allows the lid 12 to be positioned relative to the base 14 with screen 16 at an angle 36 relative to upper face 22 that is conducive to touch interaction with screen 16, including combined interaction between screen 16 and keyboard 20, while positioning screen 16 at a comfortable distance from user and while providing a reduced footprint compared to that which could be provided by a rear-hinged clamshell configuration at a comparable screen angle.

The distance of path 42 can depend on the overall size of the computer 10, which, as described above, can be largely dictated by the size of the screen 16 used in a particular configuration of computer 10. In an example, the distance that the lower edge 40 travels during opening and closing of lid 12 can be on the order of the depth of the area of upper face 22 of base 14 that is disposed to behind the keyboard 22. Such an arrangement can allow screen 16 to lie flat against face 22 in the closed position with the bottom edge 40 of lid 12 generally aligned with back edge 30 of base 14. This arrangement can further allow for the bottom edge 40 of face 32 to be positioned near keyboard 20 at least when lid 12 is in the most open position provided by hinges 18 and mounting assemblies 38. As discussed further below, the configuration of the components within both hinges 18 and mounting assemblies 38 can be configured to limit angle 36 of screen 16 relative to face 22 in the fully open position thereof. In an example, hinges 18 and mounting assemblies can be configured to provide a maximum angle 36 of rotation for screen 16 relative to upper face 22 of between about 150 degrees and about 160 degrees (+/−5%), for example about 155 degrees, although other values of angle 36 are possible.

Figure 6:
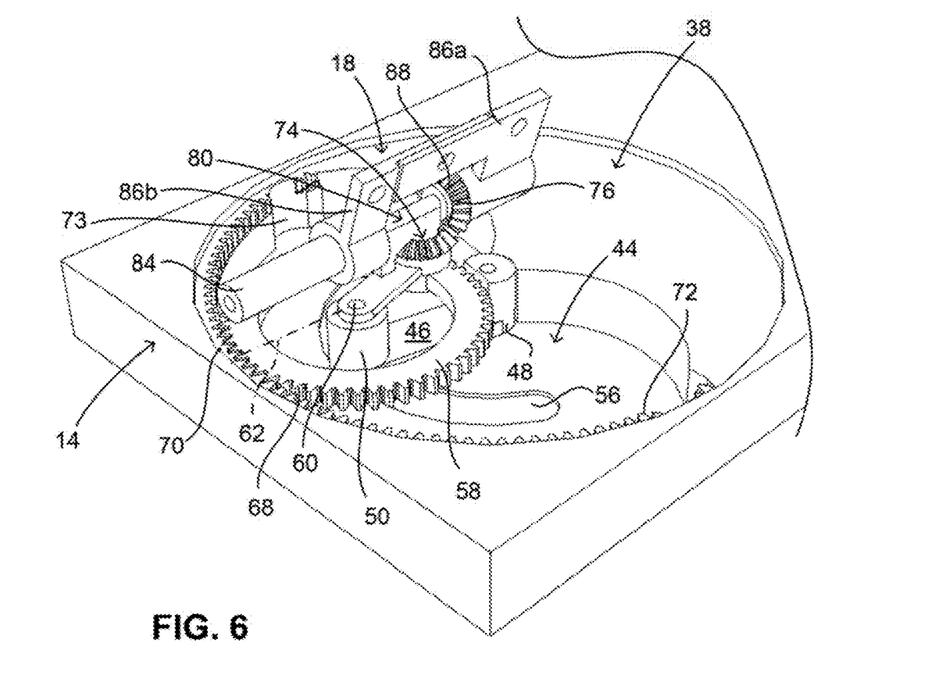
FIG. 6 is a perspective view of the gear mechanism of FIG. 5, shown in a position that corresponds with the computer arrangement of FIG. 2.
Figure 7:
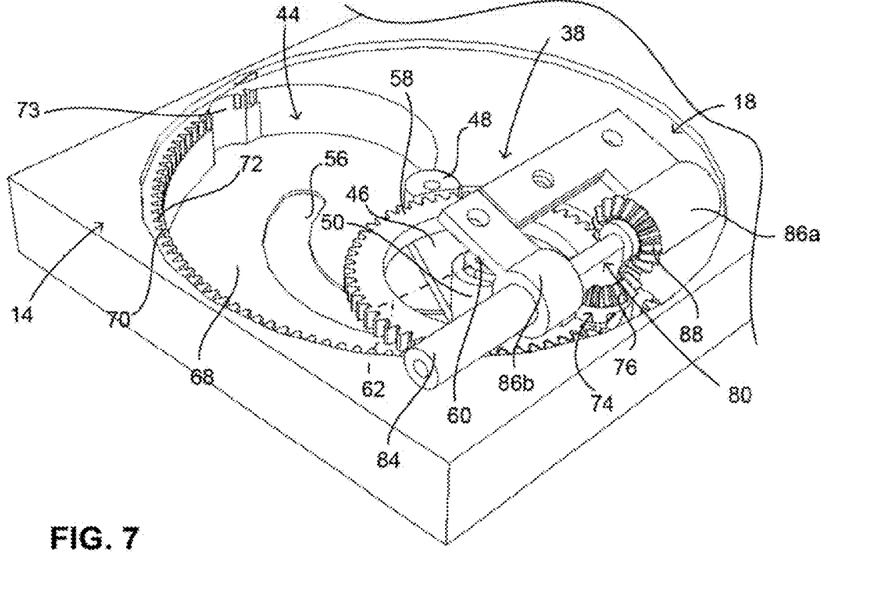
FIG. 7 is a perspective view of the gear mechanism of FIG. 5, shown in a position that corresponds with the computer arrangement of FIG. 1.
Figure 8:
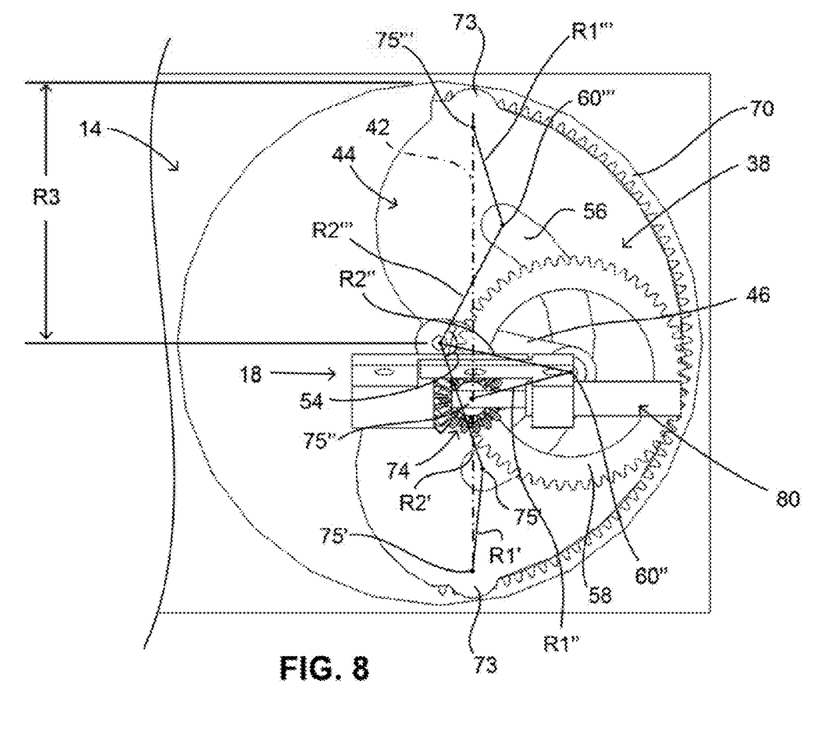
FIG. 8 is a top elevational view showing the gear mechanism in the position of FIG. 6 with additional positions of components thereof depicted schematically therein.

FIGS. 5-8 show internal components of hinge 18 and mounting assembly 36 during various stages of opening and/ or closing of lid 12 relative to base 14. As shown, mounting assembly 36 can be attached with base in a cavity 44 therein such that mounting assembly 36 is contained within base 14 or is flush with face 22 thereof. Connector 46 is rotatably mounted within cavity 44 at a first end 48 thereof and extends to a second end 50 thereof that is spaced apart from first end 48 at a length 52 of the connector 46. As shown in FIG. 8, connector 46 is configured to rotate through a predetermined angle 54 relative to base 14. Cavity 44 and/or other portions of base 14 can include features to limit angle 54 to the predetermined range. In the example shown in FIGS. 5-9, an arc-shaped slot 56 is positioned within cavity 44 beneath second end 50 of connector, which can include a portion thereof that extends into slot 56 such that the motion of connector 48 is limited to travel along the arc length of slot 56.

A planetary gear 58 is rotatably affixed at the center 60 thereof on the second end 50 of connector 46. Planetary gear 58 is further configured to extend outwardly from connector 46 to engage with a ring gear 70 that surrounds both the connector 46 and the planetary gear 58. Ring gear 70 is fixed in position with respect to base, and, as shown in FIGS. 5-9, can be integrally formed with a portion thereof. Both planetary gear 58 and ring gear 70 are configured with mutually engaging (or "meshing") teeth 68 and 72, respectively, such that planetary gear 58 rotates along a prescribed path within ring gear 70. To ensure that planetary gear 58 follows the path set forth by the mesh engagement between it and ring gear 70, connector 46, can be configured such that the length 52 thereof is sufficient to maintain planetary gear 58 in a mesh engagement with ring gear 70, while allowing planetary gear 58 to rotate freely along the prescribed path. As described above, connector 46 can be limited in its motion such as by engagement with slot 56. Such limits on the motion of connector 46 can correspondingly limit the prescribed path along which planetary gear 58 can travel, with planetary gear 58 still being considered to rotate freely within such a path. In general, such an arrangement can be achieved by configuring connector 46 to have a length R2 equal to the difference between the radius R3 of ring gear 70 (FIG. 8) and the radius 62 of planetary gear 58. In such a configuration, allowances can be made for tolerances in the size of the features described and to allow for some slack or laxity in the mesh relationship between planetary gear 56 and ring gear 70, as may be needed to prevent the gears from binding during rotation.

An attachment structure 74 is affixed with planetary gear 58 and can, further, be at least partially integrally formed therewith. The affixation of attachment structure 74 with planetary gear 58 is such that attachment structure moves along with planetary gear 58 as planetary gear 58 moves along its prescribed path within ring gear 70. Such movement includes translational movement substantially along path 42 as well as rotation about a central axis thereof through the same rotation as that of planetary gear 56 through its movement. As shown in the Figures, attachment structure can be positioned to partially extend outwardly adjacent to or past the outer edge of planetary gear 56 (i.e. radially past the teeth 68 thereof). This can be done to maximize the translational movement of attachment structure 74, which is, in part dictated by the radius 62 of planetary gear 62.

Hinge 18 is connected with attachment structure 74 such that hinge 18 is subject to the same translational movement as attachment structure 74. Hinge 18, however is rotatably affixed within attachment structure, such that it maintains the same rotational relationship with respect to base 14 and lid 12 during the rotational movement of attachment structure 74. To achieve such rotational movement in connection with the rotational movement of the lid 12 relative thereto, hinge 18 can include a coupler 80 that can include a vertical projection 82 (shown in FIG. 9) that is configured to extend into and rotationally attach within a hole 78 in attachment structure 74 so that it extends coaxially with the rotational center of attachment structure 74. Coupler 80 further includes at least one horizontal projection 84 about which lid can rotate about an axis perpendicular to the direction of rotation of the attachment structure 74. In the example shown in FIGS. 5-9, coupler 80 includes two opposed projections, 84 (further respectively designated as 84*a* and 84*b* in FIG. 9) that extend from opposite sides of vertical projection 82. The incorporation of two horizontal projections 84*a* and 84*b* can provide additional features for assembly additional components of hinge with coupler and can result in a more robust structure that can better withstand the forces applied to coupler, such as rotational forces applied thereto during opening and closing of lid 12.

Hinge 18 further includes a driving bracket 86*a* that is rotationally disposed on a horizontal projection 84*a*. Driving bracket 86*a* attaches to lid 12 to rotatably attach lid 12 to hinge 18 and, accordingly, to base 14. Driving bracket 86*a* includes a first bevel gear 88 that is affixed therewith such that first bevel gear 88 is rotated by rotation of driving bracket 86*a* (by rotation of lid 12, for example). First bevel gear 88 is positioned to mesh with a second bevel gear 76 included in attachment feature 74. Second bevel gear 76 is rigidly attached with planetary gear 58 such that rotation thereof causes rotation of planetary gear 58 within ring gear 70, which, as discussed above, causes translational movement of attachment feature 74 (and correspondingly, hinge 18 and lower edge of lid 40) substantially along path 42. As shown in FIGS. 5-9, such rotation of second bevel gear 76 can be caused, or driven, by rotation of first bevel gear 88, which is meshed with second bevel gear 76. The incorporation of bevel gears in such structure allows for rotational movement along one axis (i.e. the axis of horizontal projection 84*a*) to be translated to rotational movement along another axis (i.e. the axis of vertical projection 82). Accordingly, the structure achieved by the above-described assembly of hinge 18 with mounting assembly 38 can cause translational movement of lower edge 40 of lid 12 based on rotation of lid 12 away from base 14.

A second bracket 86*b* can be rotationally disposed on horizontal projection 84*b*, as shown in FIGS. 5-8. Second bracket 86*b* can further be affixed to lid 12 and can be positioned so as to restrict translational movement of lid 12 along the axis defined by horizontal projections 84*a* and 84*b* such as by its position relative to vertical projection 82 or another feature of coupler 80. It is noted that the actual path traveled by attachment feature 74 may not be linear but may rather be substantially linear. As used herein with respect to the path of travel of attachment feature 74, "substantially linear" can mean that the path has a component in a first direction, such as direction of linear path 42, and a component in a second direction opposite to the first direction, wherein the distance traveled in the second direction in one traversal of the path is less than 1% of the distance traveled in the first direction. In particular, the example structure shown in FIGS. 6-9 can be such that attachment feature 74 travels in a sinusoidal path with a major direction along linear path 42. The sinusoidal path traveled by attachment feature 74 can traverse path 42 such that the sinusoidal path has a phase of the length of path 42 with an amplitude perpendicular thereto. The sinusoidal path can be substantially linear in that the amplitude is less than 1% of the phase thereof. In such an example, second bracket 86*b* can be spaced apart from driven bracket 86*a* such that coupler 18 can traverse path 42 through the amplitude of the actual path of attachment feature 74. A spring (not shown) or other feature can be included between one of the brackets 86*a* or 86*b* to limit undesired movement of lid 12 relative to coupler 80.

As shown in FIGS. 1-3, a cover 90 can be affixed with hinge 18 to conceal portions of coupler 80 that extend outside of base 14 or lid 12 and to further cover first bevel gear 88 and second bevel gear 76, while allowing the gears to rotate freely through their prescribed angles of rotation. In an example, driving bracket 86*a* and second bracket 86*b* can have portions thereof adjacent to and on opposite sides of cover 90. Such portions can be spaced apart from cover 90 to allow for the above-described translational movement of coupler 18 relative to lid 12 along the axis defined by horizontal projections 84*a* and 84*b*. Similarly, the portions of hinge 18 that extend into lid 12 can be covered by portions of lid 12, including portions of face 32. Appropriate allowance can be given for cover 90 through the prescribed rotation of lid 12. As shown in FIG. 1 a second cover 92 can be arranged over brackets 68*a* and 68*b*, for example, with other configurations being possible.

As further shown in FIGS. 5-8, both hinge 18 and mounting assembly 38 can be configured to provide for the above-described constrained rotational and translational movement through desired, corresponding ranges. The top plan view shown in FIG. 8 shows features of hinge 18 and mounting assembly 38 during an intermediate position of the respective ranges of motion thereof. The position of the mounting assembly 38 and hinge 18 shown in FIG. 8 corresponds to the positions thereof shown in the perspective view of FIG. 6 as well as the depiction of computer 10 in FIG. 2. FIG. 8 also schematically depicts the positioning of various features of mounting assembly 38 in the fully open position (corresponding to FIGS. 1 and 5) as well as the fully closed position (which correspond to FIGS. 3 and 7) to illustrate the range of constrained motion of the various features.

In particular, it is shown that the overall distance of translation achievable by attachment feature 74 is related to the size of ring gear 70. As discussed above, it may be desired for lower edge 40 of lid 12 to translate during opening of lid 12 from a starting position (as shown in FIG. 3, for example) such that edge 40 is aligned with back edge 30 of base 14 to a position adjacent the rearmost portion of keyboard 20 (as shown in FIGS. 1 and 4, for example. Accordingly, it may be desired for attachment feature to traverse as much of the distance between back edge 30 and keyboard 20 as possible. To achieve this, ring gear 70 can be configured with a diameter as close as possible to the distance between back edge 30 and keyboard 20. Certain structural limitations may be such that ring gear 70 must have a diameter less than such a distance, including the integrity of the housing of the computer, as well as the necessary material to support ring gear 70 and the desired depth of teeth 72. In an example, ring gear 70 can have a diameter equal to between about 90% and 95% of the distance between back edge 30 and keyboard 20. As mentioned above, attachment structure 74 can be configured to extend partially past ring gear 70. This can be done by including cutouts 73 in the structure of ring gear 70, and can prevent the material thickness of the structures associated with attachment structure 74 (including planetary gear 58, and vertical projection 82 of coupler 80 from restricting the range of motion of the components of mounting assembly 38. For example, in the position shown in FIG. 5, a portion of planetary gear (such as the portion that defines the hole 78 of attachment feature 74) can extend into the cutout 73 disposed toward back edge 30. This positioning can allow the lower edge 40 of lid 12 or an adjacent portion thereof to be flush with back edge 30 of base 14 in the closed position.

Figure 5:
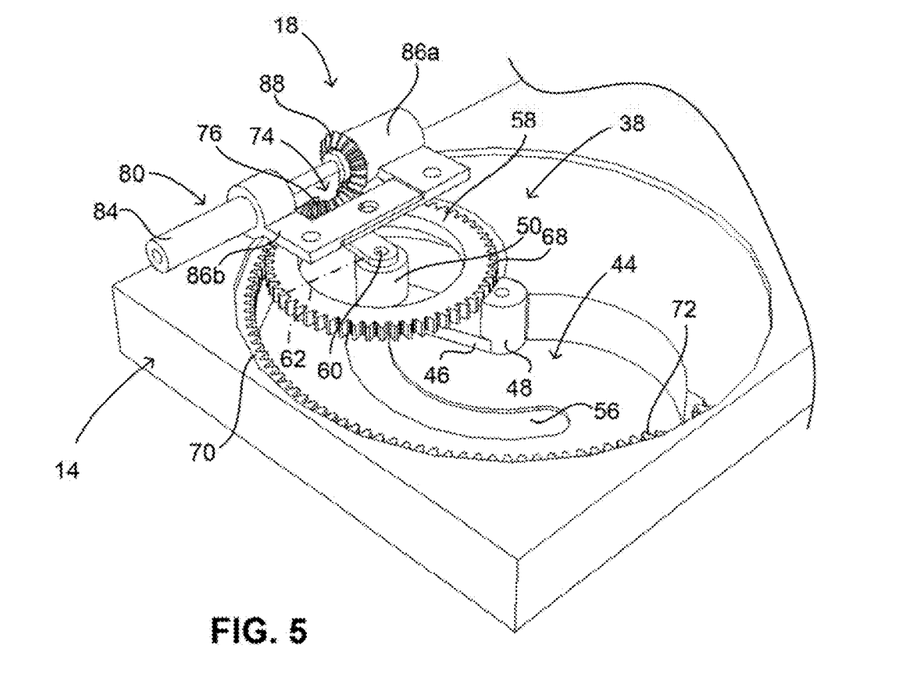
FIG. 5 is a perspective view of a gear mechanism associated with the computer of FIG. 1 shown in a position that corresponds to the closed position of the computer shown in FIG. 3.

As further shown in FIG. 8, planetary gear 58 can have a diameter that is less than 50% of the diameter of ring gear 70. For example, planetary gear can have a diameter that is approximately 49% of the diameter of ring gear 70, or greater than 47% of the diameter thereof. This can be done to appropriately position path 42 and achieve the desired range of motion of the various components affected by the size and ratios of the gears. The sizing of planetary gear 58 can also be configured to accommodate the particular structure of connector 46. As will be discussed below, it can be beneficial for first end of connector 48 to extend upward toward surface 22, and planetary gear 58 can be sized to accommodate such a configuration (as shown in FIGS. 5-7). As discussed above, the combined radius of planetary gear 58 (represented by line R1 in FIG. 8) and length of connector 46 (line R2 in FIG. 8) can be approximately equal to the radius of ring gear 70 (+/−5%, for example). Accordingly, in an example where planetary gear 58 has a diameter of less than 50% of the diameter of ring gear 70 (and radius of planetary gear is accordingly less than 25% of the diameter of ring gear 70), the length R2 of connector 46 can be greater than 25% of the diameter of ring gear 70. In a particular example, ring gear can have a diameter (as measured inside of teeth 68) of approximately 60 mm, connector can have a length R2 (measured to the inside of teeth 68) of approximately 15 mm, and radius can have a radius R1 of approximately 15 mm (all values +/−5%).

Although the mechanism depicted in FIGS. 5-8 is configured such that ring gear 58 can rotate through an angle of 180° during opening and closing of lid 12 relative to base 14, it may be desired to limit such rotation. For example, in an example wherein ring gear 58 rotates 180° during opening and closing of lid 12, connector 46, can align with the radius R1 of planetary gear 58 between center 60 thereof and attachment feature 74. Such alignment can cause binding of the mechanism in either the open or closed position of lid, making movement from such a position difficult. Accordingly, the motion of connector 46 and ring gear 58 can be limited, as discussed above by slot 56 for example, such that both rotate through an angle of less than 180° to prevent such binding. In the example shown in FIG. 8, connector can rotate through an angle of approximately 130° (+/−5%), which can correspond to a constrained rotation of planetary gear through approximately 155° (+/−5%). Such an arrangement can further help to provide for the desired positioning of lid 12 relative to base 14 in the open position. As discussed above, lid 12 can be at an angle of about 155° (+/−5%) to base 14. As explained above, the rotation of lid 12 is constrained to the rotation of planetary gear 58 by the mesh arrangement of first and second bevel gears 88 and 76, respectively. Accordingly, as in the example of FIGS. 5-8 where the ratio of the bevel gears 88 and 76 is 1:1, the angle of lid rotation between the closed and open positions will be approximately equal to the rotation of planetary gear 58 during the same motion. Therefore, the distance through which planetary gear 58 rotates will be approximately equal to the angle of lid 12 to base 14 in the fully open position (FIGS. 1, 4, and 7). It is noted that the ratio between gears 88 and 76 can be adjusted to either increase or decrease the rotation of lid 12 compared to the rotation of planetary gear 58. In some instances, however to do so may be difficult, requiring, for example a gear pitch that may be lower than desired for a robust structure.

The above-described restriction in movement may also result in a shorter distance of translation for attachment feature 74 (and accordingly, lower edge 40 of lid 12). As shown in FIG. 8, the total distance of potential travel provided by the cutouts 73 in ring gear 70, for example, may be greater than the travel, as allowed by the arc length of slot 56. The position of the center 75 of attachment feature 74 is indicated in FIG. 8, and is shown in the closed (75'), open (75''') positions, and in an intermediate position (75''). As shown, the position of center 75''' in the open position is shown short of the adjacent end of path 42. As can further be seen in FIG. 8, the radius R1 of planetary gear 58 defined between the center 60 thereof and the center 75 of attachment feature 74 does not align with the length R2 of connector 46 in either the closed position (R1' and R2', respectively) or the open position (R1''' and R2''', respectively). The corresponding positioning of brackets 86a and 86b are shown in FIGS. 5-7. In particular, the brackets 86a and 86b (which correspond to the position of lid 12) are shown as parallel to surface 22 when lid 12 is in the closed position, which corresponds to the positioning of planetary gear 58 and connector 46 indicated by center 75' of attachment feature 74 in FIG. 8 and the corresponding positions or R1', R2', and center 60' of planetary gear 58.

Similarly, the exemplary intermediate positioning of brackets 68a and 68b shown in FIG. 6 corresponds with the positioning of planetary gear 58 and connector 46 indicated by center 75'' of attachment feature 74 in FIG. 8 and the corresponding positions or R1'', R2'', and center 60'' of planetary gear 58. It is noted that center 75'' of attachment feature 74 is shown as having moved in a substantially linear path in the direction of path 42, but is not shown directly disposed on path 42. Finally, the fully open positioning of brackets 68a and 68b shown in FIG. 7 corresponds with the positioning of planetary gear 58 and connector 46 indicated by center 75''' of attachment feature 74 in FIG. 8 and the corresponding positions or R1''', R2''', and center 60''' of planetary gear 58. It is noted that R1''' is shown at an angle to R2''' in a position that will prevent binding of the mechanism during movement away from the open position (and such that the connector 46 and planetary gear 58 rotate in respective first directions during movement from closed to open and in respective opposite second directions during movement from open to closed). Accordingly, the translational movement of lower edge 40 of lid is driven by the rotation of lid 12 during opening and closing thereof.

The mechanism of mounting assembly 38, as depicted for example in FIGS. 5-8 can be concealed, as shown in FIGS. 1 and 2, buy a pair of disk-shaped covers 64 and 66. For example, outer cover 64 can be attached with connector 46 (such as by attachment with first end 48). And can be sized to match the size of cavity 44. Both cavity 44 and outer cover 64 can be circular and can be larger than the diameter of ring gear 70 so that outer cover 64 can rotate with the rotation of connector 46 and such that it can fully cover ring gear 70. Inner cover 66 can be attached with planetary gear 58 and can fit within a corresponding circular hole in outer cover 64. Attachment feature 74 can extend through inner cover 66 such that it can rotate freely with planetary gear 58. Accordingly, the opening in outer cover 64 can be sized to accommodate the rotation of attachment feature 74, which extends therethrough as well. Inner and outer covers 66 and 64 can be configured to overlap along portions thereof to provide an enclosure for mounting assembly 38 relative to base 14 to prevent dust or other debris from entering base 14 therethrough, which could disrupt the operation of hinge 18 and mounting assembly 36 or could damage internal components of base 14.

The mechanism shown herein can be implemented in a variation of computer 10 that provides for automatic opening and closing of lid 12. For example, a motor, actuator, or the like can be incorporated into mounting assembly 38 to cause the above-described movement thereof between the closed and open positions, which can drive the rotation of lid 12 relative to base 14 (as opposed to manual rotation of lid 12 driving the movement of the components of mounting assembly 38). Such a motor can be positioned within base 14, such as within cavity 44 or an adjacent portion thereof, and can be configured through gears, belts, or the like to attach with and drive rotation of connector 46, for example by connection with first end 48 or with outer cover 66.

Figure 9:
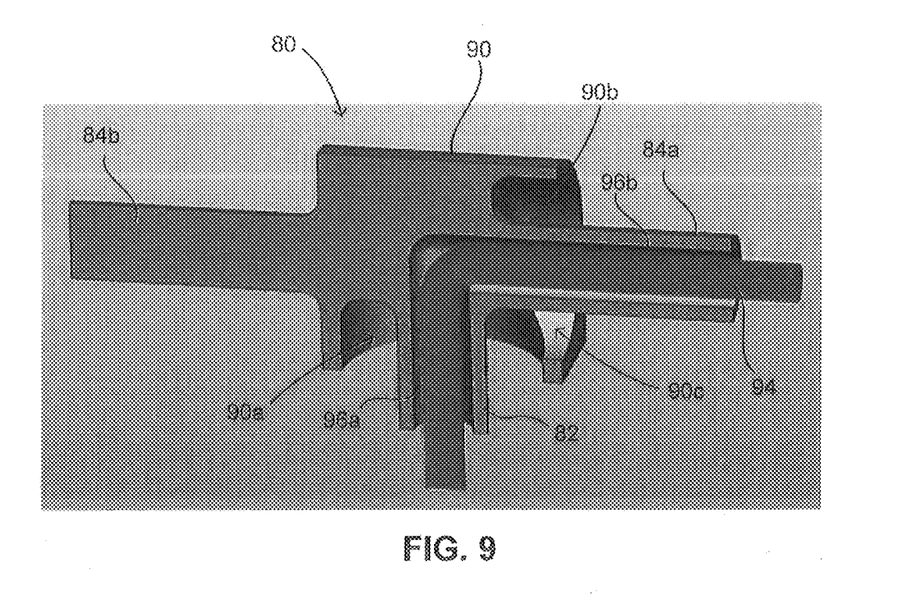
FIGS. 9 and 10 show detail views of components of a hinge mechanism that can be employed with the computer of FIG. 1.

As illustrated in FIG. 9, coupler 80 can also be configured to provide for wire routing between lid 12 and base 14. In notebook computer configurations, electrical communication must be established between base 14 and lid 12 to, for example, send a video signal to the display associated with screen 16. Further, certain electronic components can be retained in lid 12 such as WiFi or cellular antennas, among others. Accordingly, a wire or wires must extend between base 14 and lid 12. In a structure such as that of computer 10 described herein, where lid 12 moves with respect to base 14 it can be advantageous to have such a wire 94 pass through portions of mounting assembly 38 and hinge 18, which are linked to the translational and rotational movement of lid 12 with respect to base 14. It is noted that, while a single mounting assembly 38 and hinge 18 are depicted in the detail view of FIGS. 5-8 and the accompanying description above, computer 10, as depicted in FIG. 1, can include two such structures that can be mirror-images of each other. Accordingly, computer 10 can include wire routing through each of the mounting assemblies 38 and hinges 18 included therein.

To provide such wire routing, coupler 80 can include a first passage 96a through vertical projection 82 and a second passage 96b through at least one of the horizontal projections 84a and 84b, which can be through projection 84a, as shown in FIG. 9, for example. The two passages 96a and 96b can intersect within coupler 80 to define a single path therethrough that extends into base 14 at one end (of passage 96a) and into lid 12 at the other end (of passage 96b) thereof. Because wire 94 extends along the respective axis of rotation of each of the vertical projection 82 a horizontal projection 84a, it does not interfere with rotation of lid 12 with respect to coupler 18 or the rotation or translation of attachment structure 74 during opening and closing of the lid and is not itself twisted or kinked thereby. Wire 94 can then extend into base 14, for example through cavity 44, to connect with other components therein, as needed, and into lid 12 to complete the connection between the components of base 14 and the related components within lid 12.

To facilitate engagement with mounting assembly 38, body 90 may include first and second recesses 90a, b. For example, body 90 may define a first recess 90a that extends at least partially around the vertical projection 82. The first recess 90a may be generally frustoconical, except for a cutout portion 90c. Body 90 may define the cutout portion 90c such that the first recess 90a has a partially frustoconical shape and the first recess 90a may connect to the second recess 90b via the cutout portion 90c. Body 90 may also define the recess 90b so that extends at least partially around a portion of the projection 84a. The second cutout portion 90b may be generally frustoconical, except for the cutout portion 90c. In one example, a portion of body 90 may be defined by cover 92, as discussed above with respect to FIG. 1, that can be assembled with the remaining portions of coupler 80. In such an example, the recesses 90a, b can be defined by an interior of the cover 92, along a portion or portions thereof that extend over and surround portions of projections 84a,b.

The first recess 90a is configured to receive attachment structure 74, and the second recess 90b is configured to receive the first bevel gear 88. The attachment structure 74 and the first bevel gear may respectively positioned at least partially within the respective recesses, and may engage with one another via the cutout portion 90c.

Figure 10:
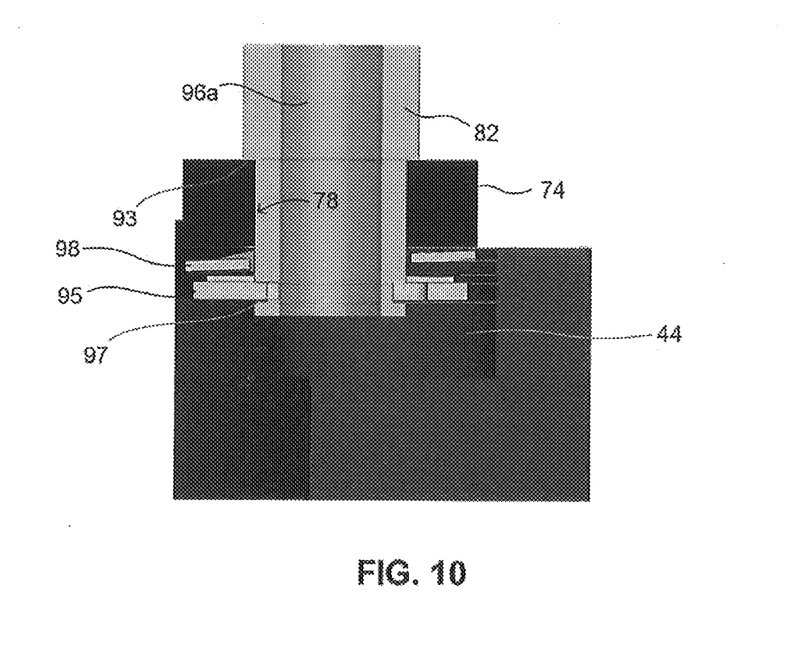

Further, as shown in FIG. 10, one or more couplers 80 can provide for the primary and/or only attachment points for lid 12 to base 14. Accordingly, coupler 80 can be configured to not only facilitate the constrained translational movement of lid 12 when lid 12 is rotated during opening and closing, but can also bear the weight of lid 12 on base 14. As shown in FIG. 10, projection 82 can include a shoulder 93 that can rest on a mating surface of attachment structure 74 (for example, an upper surface of second bevel gear 76) to allow coupler 80 to support its portion (e.g. 50%) of the weight of lid 12 on base 14 through attachment structure 74 thereof. In such an example, it is noted that outside cover 64 and inside cover 66 can contact each other as well as portions of base 14 adjacent outside cover 64 in a vertical direction to more evenly distribute the weight of lid 12 as applied to planetary gear 58 through coupler 80, which can support the mechanism of mounting assembly 38 against base 14 for more accurate positioning thereof.

Attachment of coupler 80 to attachment structure 74 can be achieved by the use of a snap washer 95 that can be positioned opposite attachment structure 74 from shoulder 93. Snap washer 98 can be assembled into a channel 97 within vertical projection 82 after insertion thereof through opening 78 and can oppose movement thereof out of attachment structure 74. A spring washer 98 can be positioned between snap washer 95 and attachment structure 74 to provide a desired predetermined amount of friction between coupler 80 and planetary gear 58. Such friction can provide a resistance to movement therebetween, which is accordingly applied to the movement between lid 12 and base 14. This can allow for hinge 18 and mounting assembly 38 to cooperatively maintain a desired position for lid 12 relative to base 14, for example, as selected by a user. The friction achieved by the presence of spring washer 98 can be determined by the materials of spring washer 98, snap washer 95 and attachment structure 74 (as well as any other associated structures or elements), as well as the spring constant and compression of spring washer 98. Such friction can be configured, for example, to maintain a desired positioning of lie 12 relative to base 14 during user interaction with screen 16 (e.g. touching or tapping thereon) and to resist movement due to the weight of lid 12, but to allow for the user to move lid 12 relative to base 14, when desired.

Figure 11:
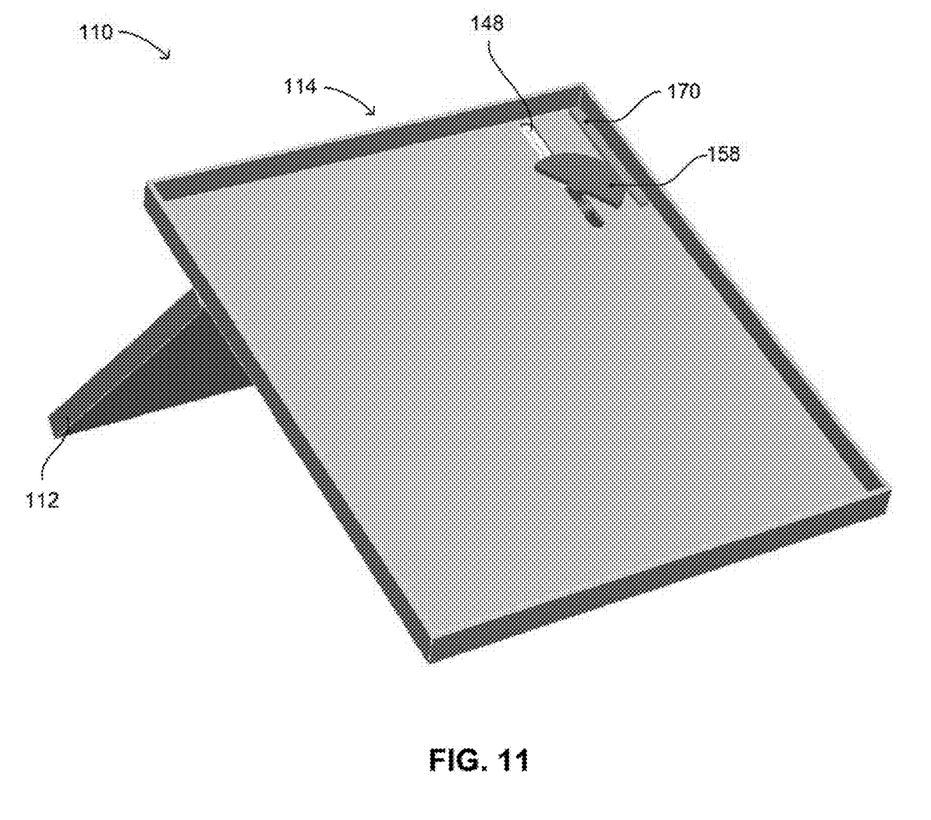
FIG. 11 shows internal components of a portable computer according to another aspect of the disclosure.

An alternative configuration for mounting assembly 138 is shown in FIG. 11. In the example of FIG. 11, mounting assembly 138 can include a pinion gear 158 positioned in a mesh arrangement with a rack gear 170. Pinion gear 185 can be arranged to move translationally with respect to base 114 by having an attachment portion 174 of pinion gear 158 engage with a slot 146 through base 114. Lid 112 can be connected with attachment portion 174 by a hinge (not shown) that is similar to hinge 18 depicted in FIGS. 1-10, including a similar connector, brackets, and a bevel gear. As such, the bevel gear (not shown) used in connection with lid 112 can mesh with another bevel gear (not shown) associated with pinion gear 158 such that rotation of lid 112 with respect to base 114 drives rotation of the pinion gear 158. The mesh arrangement of pinion gear 158 to rack gear 170 causes translational movement of pinion gear 158 along slot 148 to achieve translational movement of the lower edge 140 of lid 112 during rotation thereof in a manner similar to computer 10, as shown in FIGS. 1-3. The size (e.g. radius) of pinion gear 158 can control the amount of translational movement achieved through a corresponding rotational movement of lid 12. For example, a pinion gear with a relatively larger radius will provide a longer distance of translational movement than a smaller gear will through the same rotation. As shown in FIG. 11, pinion gear 158 can be configured as a semicircle or other arcuate shape that corresponds approximately to the amount of rotation desired for lid 112, eliminating any portions of pinion gear 158 that are not needed to mesh with rack gear 170 during the movement thereof, which can provide for additional room within base 14 and a reduction in the weight of computer 110.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A coupling mechanism of a portable computer having a base and a lid, the coupling mechanism comprising:
    a first projection operatively connected with the base of the portable computer, the first projection defining a first passage at least partially through the first projection;
    a second projection operatively connected with the lid of the portable computer, the second projection extending substantially perpendicular to the first projection, the second projection defining a second passage at least partially through the second projection, the second passage being substantially perpendicular to the first passage and being communicatively coupled to the first passage;
    a body positioned between the first projection and the second projection such that the first projection and second projection respectively extend therefrom, the body defining a first recess that extends at least partially around a portion of the first projection and a second recess that extends at least partially around a portion of the second projection;
    a wire having a first end and a second end, the wire extending through the first passage and the second passage, the wire providing an electrical connection between the base and the lid of the portable computer;
    an attachment feature engaged within the first recess and surrounding a portion of the first projection;
    wherein the attachment feature is configured for rotational movement and translational movement, the translational movement being along a first path in a direction between a back edge of the base and a keyboard located within the base in a manner that is constrained relative to the rotational movement of the lid; and
    wherein the attachment feature includes a mounting gear rotatably affixed thereto and in a mesh arrangement with a support gear coupled to the lid such that rotation of the lid about the second projection drives rotation of the attachment feature of the base, which further drives the translational movement of the attachment feature such that a lower edge of the lid is translated therewith upon rotation of the lid.

2. The coupling mechanism of claim 1, further including a first support element having a first end connected with the lid and a second end rotatably attached with the second projection and positioned within the second recess.

3. The coupling mechanism of claim 2, further including:
    a third projection extending from the body opposite the second projection and extending generally parallel thereto; and a second support element engaged with and surrounding the third projection.

4. The coupling mechanism of claim 3, wherein the first end of the first support element and the first end of the second support element are configured to overlap each other and are connected with the lid by a fixation element engaged with both the first and second support elements.

5. The coupling mechanism of claim 2, wherein:
the support gear is included within the first support element defining a portion of the first support element that is engaged with the second recess;
the mounting gear is included within the attachment feature defining a portion of the attachment feature that is engaged with the first recess.

6. The coupling mechanism of claim 2, wherein the attachment feature defines an opening therein through which the first projection extends.

7. The coupling mechanism of claim 6, further including a washer assembly attached with the first projection on a side of the attachment feature opposite the body.

8. The coupling mechanism of claim 7, wherein the washer assembly includes a spring washer and a snap washer, the snap washer being engaged with a groove formed around a periphery of the first projection, and the spring washer being compressed between the snap washer and a face of the attachment feature.

9. The coupling mechanism of claim 6, wherein:
the attachment feature is rotatable with respect to the first projection; and
the washer assembly is configured to provide a friction force between the first projection and the attachment feature to partially resist rotation therebetween.

10. The coupling mechanism of claim 1, further including a shoulder surface extending radially from and at least partially surrounding the first projection and operatively engaging with a peripheral area of the first passage to support the body in a position adjacent the base.

11. A portable computer, comprising:
a base defining a first surface and including a keyboard, a back edge, and an attachment feature;
a lid defining a lower edge and including a display and a second surface; and
a coupling mechanism, comprising:
 a first projection operatively connected with the base and defining a first passage at least partially through the first projection;
 a second projection extending substantially perpendicular to the first projection and operatively connected with the lid, the second projection defining a second passage at least partially through the second projection, the second passage being substantially perpendicular to the first passage and being communicatively coupled to the first passage; and
 a body positioned between the first projection and the second projection such that the first projection and second projection respectively extend therefrom, the body defining a first recess that extends at least partially around a portion of the first projection and a second recess that extends at least partially around a portion of the second projection; and
a wire having a first end and a second end, the wire extending through the first passage and the second passage;
a support gear rotatably coupled to the lid and received within the second recess;
wherein the first projection of the coupling mechanism is rotatably received within the attachment feature of the base;
wherein the lid is affixed to the coupling mechanism along the lower edge thereof so as to be rotatable about the second projection in a direction such that the second surface is openable and closeable against the first surface;
wherein the coupling mechanism is configured to support the lid in a selected position relative to the base;
wherein the attachment feature of the base is configured for rotational movement and translational movement, the translational movement being along a first path in a direction between the back edge and the keyboard in a manner that is constrained relative to the rotational movement of the lid; and
wherein the attachment feature includes a mounting gear rotatably affixed thereto and in a mesh arrangement with the support gear such that rotation of the lid about the second projection drives rotation of the attachment feature of the base, which further drives the translational movement of the attachment feature such that the lower edge of the lid is translated therewith upon rotation of the lid.

12. An electronic device, comprising:
a first device body including a keyboard;
a second device body including a display; and
a coupling mechanism coupling the first device body with the second device body, including:
 a first projection operatively connected with the first device body and defining a first passage at least partially through the first projection;
 a second projection extending substantially perpendicular to the first projection and operatively connected with the second device body, the second projection defining a second passage at least partially through the second projection, the second passage being substantially perpendicular to the first passage and being communicatively coupled to the first passage; and
 a body positioned between the first projection and the second projection such that the first projection and second projection respectively extend therefrom, the body defining a first recess that extends at least partially around a portion of the first projection and a second recess that extends at least partially around a portion of the second projection;
wherein the first device body includes a mounting assembly with an attachment feature, the first projection of the coupling mechanism being rotatably received within the attachment feature;
wherein the coupling mechanism is rotatably connected to a lid assembly at a location intersecting a lower edge thereof and further rotatably attached with the attachment feature of the mounting assembly, wherein the lid assembly is rotatable about the coupling mechanism with respect to a base assembly in a plane perpendicular to an upper surface of the base assembly such that the display is moveable toward and away from the keyboard; and
wherein the attachment of the coupling mechanism with the attachment feature is further such that rotation of the lid assembly drives rotation of the attachment feature, which further drives the translational movement of the attachment feature such that the lower edge of the lid assembly is translated therewith upon rotation of the lid assembly relative to the base assembly.

13. The electronic device of claim 12, the coupling mechanism further comprising:
a first support element engaged with and surrounding the second projection;

a second support element engaged with and surrounding a third projection, wherein the first support element and second support element are configured to overlap each other and are connected with the second device body by a fixation element engaged with both the first and second support elements.

14. The electronic device of claim 12, further including a washer assembly attached with the first projection on a side of the attachment feature opposite the body.

15. The electronic device of claim 14, wherein the washer assembly includes a spring washer and a snap washer, the snap washer being engaged with a groove formed around a periphery of the first projection, and the spring washer being compressed between the snap washer and a face of the attachment feature.

16. The electronic device of claim 12, wherein the attachment feature defines an opening therein through which the first projection extends.

17. A portable computer, comprising:
a first electronic component disposed in a first housing of the portable computer;
a second electronic component disposed in a second housing of the portable computer, the second electronic component being electrically connected to the first component by a wire and mechanically coupled to the first electronic component by a coupling mechanism, the coupling mechanism comprising:
   a first projection operatively connected with the first electronic component and defining a first passage at least partially through the first projection;
   a second projection extending substantially perpendicular to the first projection and operatively connected with the second electronic component, the second projection defining a second passage at least partially through the second projection, the second passage being substantially perpendicular to the first passage and being communicatively coupled to the first passage; and
   a body coupling the first projection and the second projection such that the first projection and second projection respectively extend therefrom, the body defining a first recess that extends at least partially around a portion of the first projection and a second recess that extends at least partially around a portion of the second projection;
an attachment feature engaged within the first recess and surrounding a portion of the first projection;
wherein the wire extends through the first passage and the second passage;
wherein the attachment feature is configured for rotational movement and translational movement, the translational movement being along a first path in a direction between a back edge of the base and a keyboard located within the base in a manner that is constrained relative to the rotational movement of the lid; and
wherein the attachment feature includes a mounting gear rotatably affixed thereto and in a mesh arrangement with a support gear coupled to the lid such that rotation of the lid about the second projection drives rotation of the attachment feature of the base, which further drives the translational movement of the attachment feature such that a lower edge of the lid is translated therewith upon rotation of the lid.

\* \* \* \* \*